Nov. 14, 1967  E. R. LANG  3,353,174
ELECTROMAGNETIC INDICATOR GATING ARRANGEMENT
Filed May 28, 1964  3 Sheets-Sheet 1

INVENTOR
ELLIOT R. LANG
BY
ATTORNEYS

Nov. 14, 1967 E. R. LANG 3,353,174
ELECTROMAGNETIC INDICATOR GATING ARRANGEMENT
Filed May 28, 1964 3 Sheets-Sheet 2

INVENTOR
ELLIOT R. LANG
BY
Weingarten, Orenbuch & Lahive
ATTORNEYS

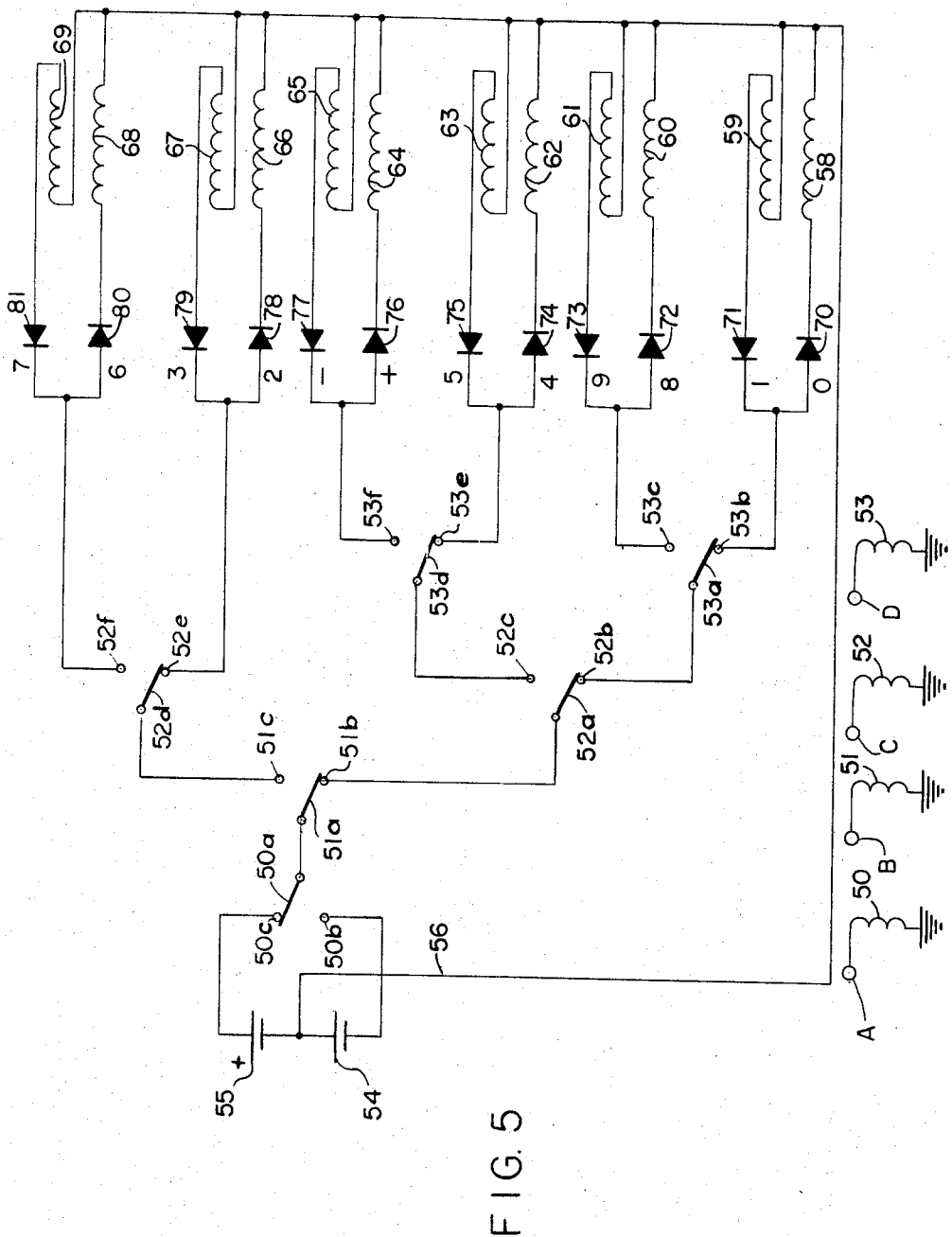

United States Patent Office 3,353,174
Patented Nov. 14, 1967

3,353,174
ELECTROMAGNETIC INDICATOR GATING ARRANGEMENT
Elliot R. Lang, Hamden, Conn., assignor to Patwin, Inc., a corporation of Connecticut
Filed May 28, 1964, Ser. No. 370,891
4 Claims. (Cl. 340—325)

ABSTRACT OF THE DISCLOSURE

The stator of an electromagnetic indicator has a plurality of coils arranged in pairs. Each coil, when separately energized, causes the rotor of the indicator to assume a station where a selected symbol is displayed. The symbol is chosen by applying binary coded electrical signals to an array of relays. The relays, in response, form an electrical path that applies a potential across a pair of the coils. Diodes permit current to flow in only one coil of the pair in dependence upon the polarity of the applied potential. One of the relays governs the polarity of the applied potential and thereby determines which one of the two coils is energized.

---

This invention relates to electromagnetic indicators and more particularly to an improvement in indicators of the type having a rotatable drum which can be selectively positioned by the influence upon a rotatable magnet of a magnetic field established by the stator of the indicator so that indicia marked on the rotatable drum is selected for display.

An electromagnetic indicator of the general type here considered is described in U.S. Patent No. 2,908,900, issued to B. M. Gordon et al. on Oct. 13, 1959. That patent discloses an electromagnetic indicator for displaying alpha-numeric characters, the indicator employing a salient pole magnet which rotates within a circular array of separately energizable stator coils mounted upon pole pieces that are arranged symmetrically about the circle of the array. The alpha-numeric indicia are carried upon a drum which is arranged to rotate with the magnet. Energization of one or more of the coils of the array causes a magnetic field to be established which is so oriented that when the salient pole magnet rotates into alignment with the orientation of the magnetic field one of the characters on the drum is brought into a display position. By applying an electric potential to the appropriate coil in the array, any one of the alpha-numeric indicia carried upon the drum can be brought into the display position.

This invention is directed to a gating arrangement for causing the electromagnetic indicator to display a selected character in a response to the impress upon the gating arrangement of electrical signals coded in accordance with a binary numeric system. The gating arrangement employs a signal relay for each bit in the coded signals. The signal relays respond to the coded electrical signals by causing an electrical path to be established which permits an electrical potential to be applied across two of the stator coils. One of those two coils, when energized by a current, causes the selected character to be displayed. The polarity of the potential impressed across the two coils is determined by the relay that responds to the least significant bit in the coded signals. A pair of diodes are arranged to permit current to flow through one of the two coils and to block current flow in the other coil. The polarity of the potential impressed across the two coils, therefore, determines which one of the coils is energized and which one is blocked. The invention, further, may incorporate a latching arrangement whereby the signal relays are locked in position until released by an unlatching signal. The latching arrangement permits the indicator to respond to coded signals, which may be of short duration, by displaying the selected character and retaining that display until a new display is commanded by the impress of a new set of coded signals.

The arrangement of the invention and the manner in which the invention operates can be better understood by a perusal of the following exposition when considered in conjunction with the appended drawings in which:

FIG. 5 illustrates the scheme of another embodiment of the invention.

Figure 1:
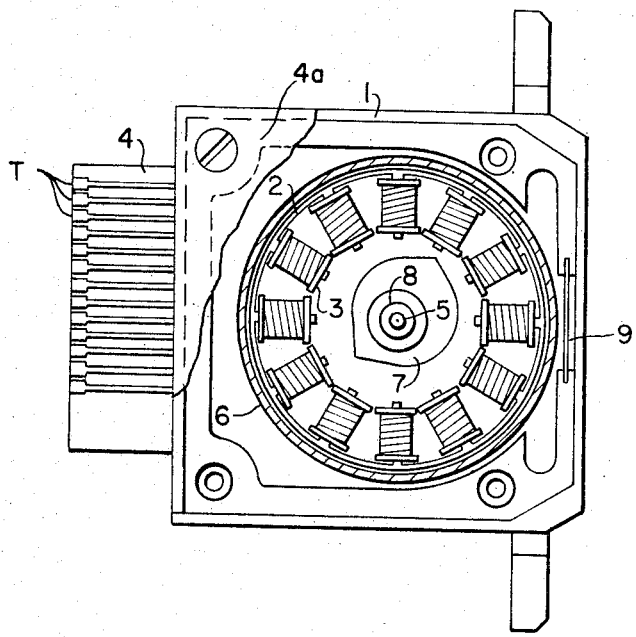
FIG. 1 is a view of an electromagnetic indicator whose cover plate has been broken away to show the interior of the housing.

Referring now to FIG. 1, there is depicted an electromagnetic indicator having a rectangular box-like housing 1 containing a chamber in which are disposed the stator and the rotor of the indicator. The stator utilizes a circular ring 2, constructed of a material of high magnetic permeability, having twelve poles extending radially inward. A separately energizable electrical winding, such as the winding 3, is mounted upon each of the radial poles. The chamber is bounded on one side by a cover plate 4A, shown broken away in FIG. 1, and is bounded on the other side by a wall 4 that is permanently secured to the housing 1. The wall 4 has a portion that extends rearwardly of the housing and that wall acts as the base of a printed circuit having terminals exposed upon the rearwardly extending portion. The winding of the stator can be separately electrically energized by impressing a voltage upon the terminals T. The stator is fixed in position, preferably by securing it to the side wall 4 with a suitable potting compound. Projecting from the side wall 4 into the chamber is a shaft 5 which is disposed in the center of the ring 2. The shaft serves as the typical axis for the rotor shown in FIG. 2. The rotor utilizes a drum 6 secured to a salient pole magnet 7 by a hollow hub 8 so that the entire rotor turns as a unit. The internal diameter of the hollow hub is just enough to permit the rotor to be slipped onto shaft 5 and to rotate freely thereon.

Upon the peripheral surface of drum 8 is marked a plurality of characters such as the numerals 0 through 9, a minus sign (−), and a plus sign (+). A window 9 is provided in the front of the housing 1 through which the characters on the drum can be seen. The position of the drum determines which of the characters is brought into registry with the window. When one of the windings of the stator is energized, a magnetic field is established which causes the rotor to turn until the salient pole magnet is aligned with the magnetic field. The position of the drum, therefore, is determined by that one of windings on the stator which is energized.

Figure 2:
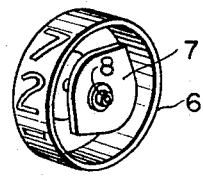
FIG. 2 is a perspective view of the rotor of the indicator shown in FIG. 1.

The construction of an electromagnetic indicator of the type depicted in FIGS. 1 and 2 is more fully described in my patent application Ser. No. 344,337, filed Feb. 12, 1964.

Figure 3:
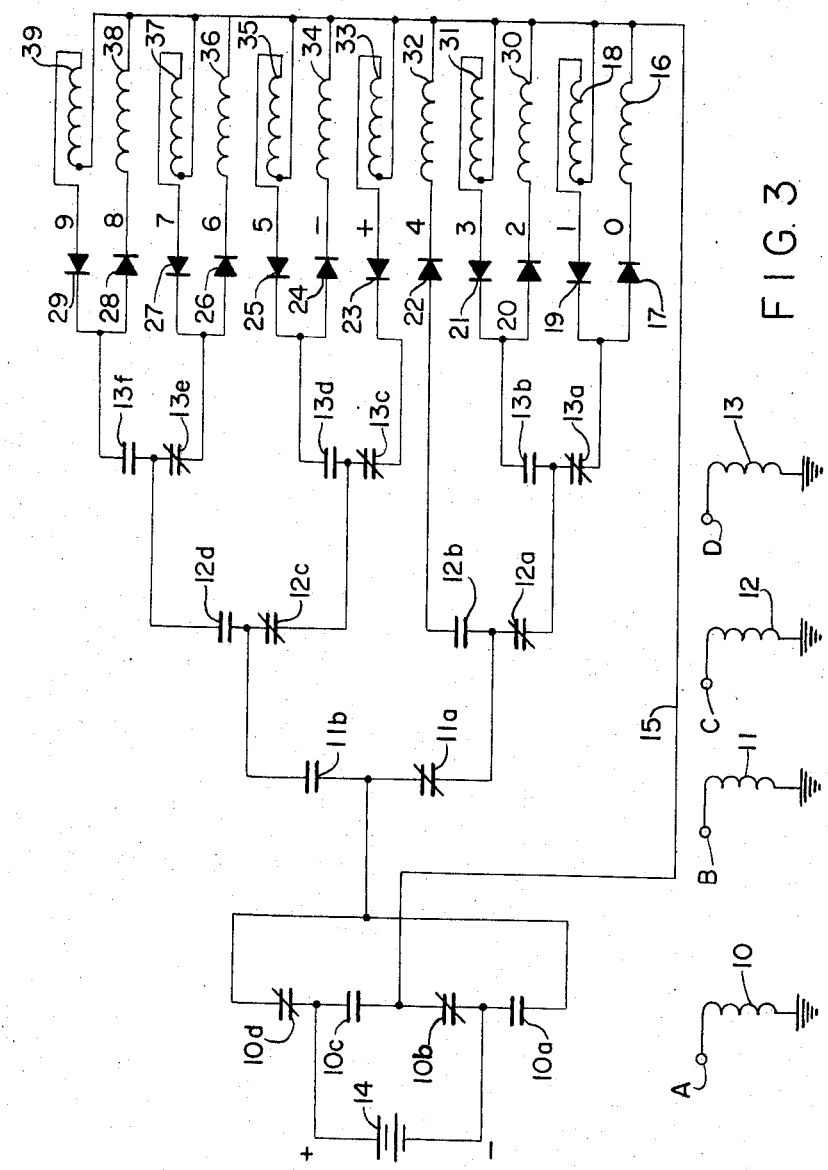
FIG. 3 depicts the scheme of an embodiment of the invention.

FIG. 3 illustrates a gating arrangement for causing the indicator to respond to a group of binary coded electrical signals. By binary coded electrical signals it is meant that each signal in the group is permitted to assume either one of two possible states, one of the states representing a binary ONE and the other state representing a binary ZERO. It is customary to use ground potential as one state and either a positive or negative voltage as the other state. Occasionally a negative voltage is used as one state and a positive voltage is used as the other state. Indications of the type here considered usually are of the decimal kind; that is, the indicia to be displayed are the numerals 0 through 9. To represent the numbers 0 through 9 in a binary system, a four bit binary code is normally employed. Where electrical signals are coded in accordance with the four bit binary code, the signals are sometimes referred to as binary coded decimal signals.

In considering the arrangement shown in FIG. 3, it is assumed that the input signals applied at terminals A, B, C, D to the windings of relays 10, 11, 12, and 13 are binary coded decimal signals. Any signal that is at a potential insufficient to operate the relay can represent a binary ZERO and any signal that causes a current flow in the winding sufficient to cause the relay to operate can represent a binary ONE. For convenience, a signal at ground potential is arbitrarily assumed to represent a binary ZERO and a positive five volt signal is assumed to represent a binary ONE.

Relay 10 is equipped with four sets of contacts 10a . . . 10d, contacts 10b and 10d being normally closed and contacts 10a and 10c being normally open. The "normal" condition, i.e., the condition of the contacts when no current flows in the relay winding, is represented in FIG. 3 by a slant line across those contacts which are normally closed and the absence of a slant line where the contacts are normally open. Relay 11 is equipped with two sets of contacts 11a and 11b, 11a being normally closed and the other set being normally open. Relay 12 is equipped with four sets of contacts 12a . . . 12d, 12a and 12c being normally closed and the other two sets of contacts being normally open. Relay 13 has six sets of contacts 13a . . . 13f, sets 13a, 13c, and 13e being normally closed and the other three sets, 13b, 13d, and 13f, being normally open.

A suitable source of electric potential, represented in FIG. 3 by the battery 14 is arranged so that one terminal of the source is connected between contacts 10c and 10d and the other source terminal is connected between contacts 10a and 10b. A lead 15 is connected between contacts 10b and 10c. With relay 10 deenergized, the lead 15 is coupled through contacts 10b to the negative side of battery 14, whereas when relay 10 is energized, lead 15 is coupled through contacts 10c to the positive side of the battery.

Assuming that the indicator has twelve characters upon the drum of the rotor, twelve windings are employed in the stator, the windings being conventionally depicted in FIG. 3. As is evident, each winding has one end connected in common to lead 15 and the other end connected through a diode to a contact of relay 13 or relay 12. No more than two windings are connected to the same relay contact. For example, winding 16 is connected through diode 17 to one of the contacts of set 13a and winding 18 is connected through diode 19 to the same contact of set 13a. The windings are arranged, as shown in FIG. 1, so that the inner poles are of the same nature when the windings are energized. For example, when each coil of FIG. 1 is energized, the inner pole is always a north pole. This arrangement is indicated in FIG. 3 by connecting the windings so that the current flow through them is always in the same direction, viz., from left to right.

Sets 10a, 10d, 11a and 11b each have one contact connected together. The other contact of set 11b is connected between contacts 12c and 12d, whereas the other contact of set 11a is connected between contacts 12a and 12b. Sets 12d, 13e and 13f each have one contact connected together. Sets 12c, 13c and 13d each have one contact connected together. One contact of each of sets 12a, 13a and 13b are connected together. Contacts 13b control the flow of current through diodes 20 and 21, contacts 12b control the current to diode 22, contacts 13c control the current through diode 23, contacts 13d control the flow of current through diodes 24 and 25, contacts 13e control the flow of current through diodes 26 and 27, and contacts 13f control the flow of current through diodes 28 and 29.

The indicator is arranged to display the numerals 0 through 9, the positive sign (+), and the negative sign (—). Binary coded electrical signals are applied at terminals A, B, C, D to cause the desired numeral or sign to appear in the window of the housing. The following table indicates the coded signals which are applied to the input terminals A, B, C, D of relays 10, 11, 12, 13 to obtain the display given at the right of the table.

| D | C | B | A | Display |
|---|---|---|---|---------|
| 0 | 0 | 0 | 0 | 0 |
| 0 | 0 | 0 | 1 | 1 |
| 0 | 0 | 1 | 0 | 2 |
| 0 | 0 | 0 | 1 | 3 |
| 0 | 1 | 0 | 0 | 4 |
| 1 | 0 | 1 | 1 | 5 |
| 0 | 1 | 1 | 0 | 6 |
| 0 | 1 | 1 | 1 | 7 |
| 1 | 1 | 1 | 0 | 8 |
| 1 | 1 | 1 | 1 | 9 |
| 0 | 0 | 1 | 1 | + |
| 1 | 0 | 1 | 0 | — |

For example, to cause the numeral 8 to be displayed, ONE input signals are applied to terminals B, C, and D while a ZERO input signal is applied at terminal A. The ONE signals cause relays 11, 12 and 13 to be energized, whereas the ZERO signal causes relay 10 to be deenergized. Upon energization of relays 11, 12, and 13, the normally open contacts of those relays close while the normally closed contacts open. Because relay 10 is not energized, its contacts are in their "normal" states. Common lead 15 is, therefore, connected to the negative side of battery 14 while the positive side of the battery is connected through contacts 10d, 11b, 12d and 13f to diodes 28 and 29. Diode 28 permits current to flow through electromagnet winding 38, whereas diode 29 blocks the flow of current through winding 39. Of the twelve coils, only one coil is energized and that one causes the rotor of the indicator to rotate to a position where the numeral 8 is displayed in the window of the housing.

To cause a minus (—) sign to be displayed, ONE signals are impressed upon input terminals B and D of relays 11 and 13 while ZERO signals are simultaneously applied at terminals A and C of relays 10 and 12. The ONE signals energize relays 11 and 13 while the ZERO signals cause relays 11 and 13 to be deenergized. The contacts of relays 11 and 13 remain in their "normal" states whereas the normally open contacts of the energized relays are caused to close and normally closed contacts are caused to open. Lead 15, therefore, is connected through contacts 10b to the negative side of battery 14 and the positive terminal of the battery is connected through contacts 10d, 11b, 12c, and 13d to diodes 24 and 25. Diode 24 permits current to flow through winding 34 whereas diode 25 blocks the flow of current through winding 35. Only winding 34 is energized by a flow of current and the magnetic field established by it causes the minus (—) sign to be displayed in the window of the indicator.

Each coil, when energized, causes a different one of the indicia on the drum of the rotor to appear in the window of the housing. In FIG. 3, the indicia associated with the energized coil appears at the left of the winding. For example, the energizing of winding 16 results in the display of the numeral 0, energization of winding 18 causes numeral 1 to be displayed, energization of winding 30 causes numeral 2 to be displayed, and so on. While, the schematic drawing of FIG. 3 shows twelve windings, it is evident that the number of windings can be increased to sixteen, if desired. If more than sixteen coils are to be employed in the stator of the indicator, a five bit code must be used, and an additional relay must be added to the four already employed. The extension of the scheme shown in FIG. 3 to accommodate more than sixteen windings require extrapolation of the disclosed logical gating sequence.

Figure 4:
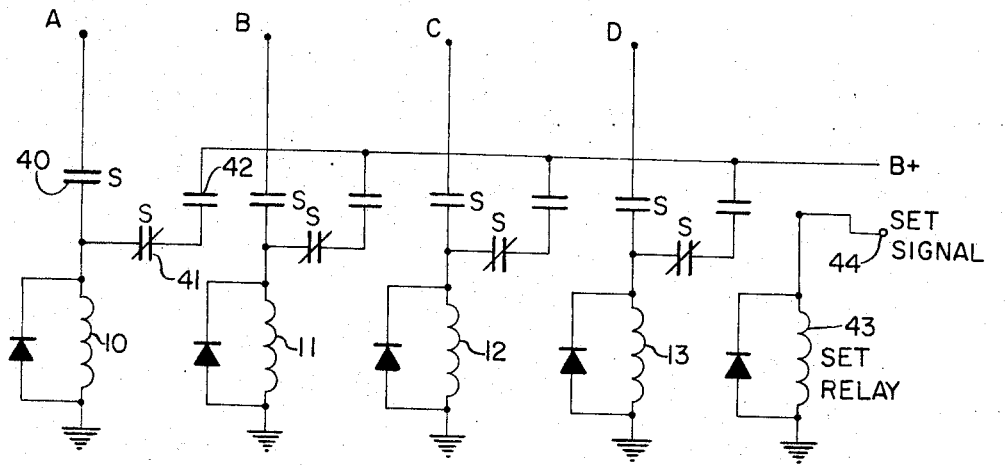
FIG. 4 shows a latching arrangement that may be used in conjunction with the signal relays of the embodiment of FIG. 3.

FIG. 4 depicts the scheme of an arrangement for "latching" relays 10, 11, 12 and 13. The scheme is used, for example, where the coded electrical signals are pulses of short duration. Since the latching arrangement is identical for each of the relays, only the arrangement of relay 10 is described in detail.

Input terminal A is connected to the winding of relay 10 through a set of normally open contacts 40. The winding is also connected to a source of voltage, B+, through a set of normally closed contacts 41 and a set of normally open contacts 42. Contacts 40 and 41 are marked with an S to indicate that they are part of the relay 43 whose winding 44 is connected to a terminal 45 at which SET signals are applied. Contacts 42 are part of relay 10 and therefore are open when that relay is deenergized and closed when the relay is energized. The SET signal applied to the winding of relay 43 is simultaneous with and of shorter duration than the coded signals applied to input terminals A, B, C, D.

Assuming that relay 10 is in a deenergized state, contacts 42 are open. When a SET signal is applied at terminal 45, relay 43 becomes energized, causing contacts 41 to open and contacts 40 to close. Where the coded signal simultaneously applied to terminal A is a ONE, a current flows in the winding of relay 10 that causes contacts 42 to close. The SET signal is of shorter duration than the ONE signal so that the SET relay becomes deenergized while the ONE signal persists at terminal A.

Deenergization of the SET relay causes contacts 41 to close followed a short time later by the opening of the slower acting contacts 40. As contacts 40 are slower acting than contacts 41, the B+ voltage is connected through contacts 42 and 41 to the winding of relay 10 when contacts 40 open. Relay 10, therefore, remains energized even though it is disconnected from the signal at terminal A by open contacts 40. The relay remains energized until the next SET signal is impressed at terminal 44. That next SET signal causes the SET relay to become energized, whereupon contacts 41 open and disconnect relay 10 from the B+ source while contacts 40 close and connect the relay winding to the signal at terminal A. Because contacts 41 close before contacts 40 open, relay 43 is sometimes referred to as being of the "make before break" type.

If the coded signal applied to terminal A is a ZERO, no current flows in the winding of relay 10 though contacts 40 are closed by operation of the SET relay. In the absence of energization of relay 10, contacts 42 are open and remain open when contacts 41 close upon decay of the SET signal. Relay 10, therefore, reverts to or remains in its deenergized state when the coded signal at terminal A is a ZERO.

The SET signal need not be of shorter duration than the input signals applied at terminals A, B, C, and D, but can be of the same duration as the coded signals. Where the SET signal is of equal duration, the signal relays 10, 11, 12, 13 should be slower in operation than SET relay 43. The operation of the signal relays can be retarded by connecting a diode across the winding as indicated in FIG. 4.

The latching arrangement causes relays 10, 11, 12 and 13, to be latched in the interval between SET signals. That is, relays 10, 11, 12 and 13 can change from one condition to another only upon the application of a SET signal which releases the latch. Upon deenergization of the SET relay, relays 10, 11, 12, and 13 must remain in their established states until the next SET signal trips the latch.

FIG. 5 shows the scheme of a gating arrangement for causing the indicator to respond to electrical signals coded in accordance with the standard binary numeric system. In this arrangement, the indicator has marked upon the drum of the rotor numerals 0 through 9, a minus (−) sign and a plus (+) sign. The stator of the indicator is, therefore, provided with twelve coils disposed in the manner shown in FIG. 1. Each of the twelve windings 58 through 69 has one of its ends coupled to a common lead 56 that is connected between a pair of serially connected power sources, here illustrated as batteries 54 and 55.

The binary coded electrical signals are applied to terminals A, B, C, and D of relays 50, 51, 52 and 53 respectively. Relay 50 has a transfer contact 50a disposed between a pair of stationary contacts 50b and 50c, the transfer contact being closed upon contact 50c when the relay winding is deenergized. The positive terminal of battery 55 is connected to contact 50c and the negative terminal of battery 54 is connected to contact 50b. Batteries 54 and 55 are in effect a signal power source that has a central tap connected to lead 56. The transfer contact of relay 50 is connected to the transfer contact 51a of relay 51, transfer contact 51a being disposed between contacts 51b and 51c and being normally closed upon contact 51b. Relay 52 is provided with two transfer contacts, contacts 52a and 52b which are connected respectively to contacts 51b and 51c. Transfer contact 52a is normally closed upon contact 52b which is connected to transfer contact 53a of relay 53. Contact 52c is connected to transfer contact 53d of relay 53, that transfer contact being normally closed upon contact 53e.

The twelve coils 58 through 69 of the stator can be deemed to form six pairs, each pair being energized through a different contact of either relay 53 or relay 52. For example, windings 58 and 59 are connected by diodes 70 and 71 to contact 53b of relay 53, whereas windings 66 and 67 are connected by diodes 78 and 79 to contact 52e of relay 52. The two diodes associated with each pair of windings are arranged to permit current flow in one coil of the pair and block current flow in the other coil.

By applying the coded signals tabulated below to the input terminals A, B, C, D of relays 50, 51, 52 and 53, the character given at the right of the table is displayed in the window of the indicator. It is evident that the sequence of coded signals given in the table follows the standard binary numeric system.

| D | C | B | A | Display |
|---|---|---|---|---------|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 1 | 0 | 0 | + |
| 1 | 1 | 0 | 1 | − |

For example, to cause the numeral 4 to be displayed, ZERO input signals are applied to terminals A, B, and D while a ONE signal is impressed at terminal C. The ONE signal causes relay 52 to be energized so that the transfer contacts 52a and 52b close respectively upon contacts 52c and 52f. The ZERO signals applied to relays 50, 51, and 53 cause those relays to be deenergized so that their contacts assume their "normal" states. The positive terminal of battery 55 is connected through contacts 50c, 51b, 52c, and 53e to diodes 74 and 75. As lead 56 is connected to the negative end of battery 55, diode 74 permits a current to flow through winding 62 whereas diode 75 blocks the flow of current through winding 63. Of the twelve coils of the stator, only coil 62 is energized. The energized coil establishes a magnetic field oriented so that when the salient pole magnet rotates into alignment with the magnet field, the numeral 4 appears in the window of the indicator.

Each coil, when separately energized, causes a different numeral or other character to be displayed in the window. The indicia associated with the energized winding, is indicated in FIG. 5 at the left of the winding.

In view of the many ways in which the disclosed embodiments can be changed without departing from the essential nature of the invention, it is not intended that the scope of the invention be restricted to the precise arrangements depicted in the drawings or described in the specification. Rather it is intended that the scope of the invention be delimited by the claims appended hereto and to include such structures as do not in essence fairly depart from the invention there defined.

What is claimed is:

1. A gating arrangement for causing an electromagnetic indicator to respond to binary coded electrical signals, the electromagnetic indicator being of the type having an array of separately energizable stator coils, the gating arrangement comprising:
    a source of electrical potential;
    a plurality of signal relays, each signal relay being responsive to a different bit in the coded electrical signals;
    the signal relays, in response to the binary coded electrical signals, causing an electric path to be established which applies an electric potential from the source across two of the stator coils;
    diodes connected to the stator coils, the diodes being arranged to permit current flow in one of the two coils to which the electric potential is applied and to block current flow in the other of the two coils;
    and the signal relay responding to the least significant bit being arranged to cause a reversal in polarity of the potential applied to the two stator coils.

2. A gating arrangement for causing an electromagnetic indicator to respond to binary coded electrical signals, the electromagnetic indicator being of the type having an array of separately energizable stator coils, the gating arrangement comprising:
    a source of electric potential;
    a plurality of signal relays, each signal relay being responsive to a different bit in the coded electrical signals;
    the signal relays, in response to the binary coded electrical signals, causing relay-controlled contacts to establish an electric path that applies the electric potential of the source across two of the stator coils;
    diodes, connected to the stator coils, the diodes being arranged to permit current flow in one of the two coils to which the electric potential is applied and to block current flow in the other of the two coils;
    and the signal relay responding to the least significant bit being arranged, in response to a change in signal, to cause a reversal in polarity of the applied potential.

3. A gating arrangement for causing an electromagnetic indicator to respond to binary coded electrical signals, the electromagnetic indicator being of the type having a circular array of separately energized stator coils, the gating arrangement comprising:
    a plurality of signal relays, each signal relay corresponding to a different bit in the coded electrical signals;
    means for impressing the binary coded electrical signal bits upon the windings of the corresponding signal relays;
    a source of electric potential;
    the signal relays having contacts arranged to provide an electrical path that applies the electric potential of the source across two of the stator coils in the array;
    diodes connected to the stator coils, the diodes being arranged to permit current flow in one of the two coils and to block current flow in the other of the two coils;
    and the signal relay responding to the least significant bit being arranged, in response to a change in signal, to cause a reversal in polarity of the applied potential.

4. A gating arrangement for causing an electromagnetic indicator to respond to binary coded electrical signals, the electromagnetic indicator being of the type having an array of separately energizable stator coils, the gating arrangement comprising:
    a plurality of signal relays, each signal relay responding to a different bit in the coded electrical signals;
    each signal relay, when energized, having contacts connecting its winding to a current source;
    a plurality of signal input terminals at which the coded electrical signals are impressed;
    a latching relay having contacts arranged to connect the winding of each signal relay to a different one of the signal input terminals while disconnecting the signal relay winding from the voltage source;
    a source of electric potential;
    the signal relays having other contacts arranged to establish an electrical path that applies an electric potential of the source across two of the stator coils in the array;
    diodes connected to the stator coils, the diodes being arranged to permit current flow in one of the two coils and to block current flow in the other of the two coils;
    and the signal relay responding to the least significant bit, being arranged, in response to a change in signal, to cause a reversal in polarity of the applied potential.

References Cited

UNITED STATES PATENTS

| 2,628,277 | 2/1953 | Spencer | 340—147 |
| 2,872,114 | 2/1959 | Wilson | 340—147 |
| 3,021,518 | 2/1962 | Kilman et al. | 340—347 |
| 3,098,221 | 7/1963 | Propster. | |

FOREIGN PATENTS 911,826  11/1962  Great Britain.

NEIL C. READ, *Primary Examiner.*

A. J. KASPER, *Assistant Examiner.*